United States Patent [19]

Hayashi et al.

[11] Patent Number: 5,198,164
[45] Date of Patent: Mar. 30, 1993

[54] METHOD OF FIRING CERAMIC BUILDING MATERIALS

[75] Inventors: Yuji Hayashi; Hiroshi Mori; Keisuke Katayama, all of Tokoname, Japan

[73] Assignee: Inax Corporation, Tokoname, Japan

[21] Appl. No.: 721,567

[22] PCT Filed: Feb. 22, 1991

[86] PCT No.: PCT/JP91/00223
§ 371 Date: Jul. 26, 1991
§ 102(e) Date: Jul. 26, 1991

[87] PCT Pub. No.: WO91/13039
PCT Pub. Date: May 9, 1991

[30] Foreign Application Priority Data
Feb. 27, 1990 [JP] Japan .................................. 2-46840

[51] Int. Cl.$^5$ .............................................. C04B 35/64
[52] U.S. Cl. ...................................... 264/58; 414/159; 432/6
[58] Field of Search ............... 264/58; 432/6; 414/159

[56] References Cited

U.S. PATENT DOCUMENTS

| | | | |
|---|---|---|---|
| 3,351,687 | 11/1967 | Thome | 264/58 |
| 3,402,834 | 9/1968 | Kelsey | 264/58 |
| 4,193,761 | 3/1980 | Mantegani | 432/128 |

FOREIGN PATENT DOCUMENTS 1490404 11/1977 United Kingdom .

OTHER PUBLICATIONS

Reed, Introduction to the Principles of Ceramic Processing, John Wiley & Sons, New York, 1988, pp. 440-445.

Primary Examiner—James Derrington
Attorney, Agent, or Firm—Kanesaka & Takeuchi

[57] ABSTRACT

When ceramic building materials are fired in a roller hearth kiln, they are stacked in a plurality of layers, and allowed to reside in the kiln for a time of at least three hours.

4 Claims, 4 Drawing Sheets

METHOD OF FIRING CERAMIC BUILDING MATERIALS

TECHNICAL FIELD

This invention relates to a method of firing ceramic building materials, such as tiles, bricks and roofing tiles, in a roller hearth kiln.

BACKGROUND ART

The roller hearth kiln is a tunnel-shaped furnace in which a multiplicity of rollers is disposed horizontally and parallel to one another. The materials to be fired are conveyed on the rollers from the inlet to outlet of the kiln so as to be passed through the preheating, firing and cooling zones thereof.

When firing ceramic building materials, such as tiles, bricks or roof tiles, in a roller hearth kiln, it has hitherto been usual practice to feed them one after another through the kiln. It has been usual that each material to be fired has a residence time of, say, one to two hours in the kiln (the time between its charging in the kiln at the inlet thereof and its discharging therefrom at the outlet thereof).

Such a short residence time is one of the advantages arising from the use of a roller hearth kiln, and contributes to rapid firing.

The residence time as stated above is, however, so short that a roller hearth kiln can be used only for firing a material comprising a body and glaze which can be rapidly fired. Moreover, the time is too short for producing a deep color by reduction or oxidation on the material to be fired.

DISCLOSURE OF THE INVENTION

This invention provides a method of firing ceramic building materials in a roller hearth kiln, wherein the materials are stacked in a plurality of layers so as to reside in the kiln for a time of at least three hours.

The arrangement of the materials in a stack enables them to reside in the kiln for a prolonged period of time and thereby be fired for a correspondingly prolonged period of time. The use of the residence time which is as long as at least three hours with a carefully controlled firing atmosphere, enables the development of a deep color by reduction or oxidation on the materials to be fired. The method of this invention is applicable to an expanded range of materials including any material comprising a body and glaze which cannot be rapidly fired. Moreover, it can fire any material uniformly from its surface to its core, even if it may be a large material having a thickness not smaller than 25 mm, or even not smaller than 30 mm.

BEST MODE OF CARRYING OUT THE INVENTION

The invention will now be described by way of example with reference to the drawings.

Figure 1:
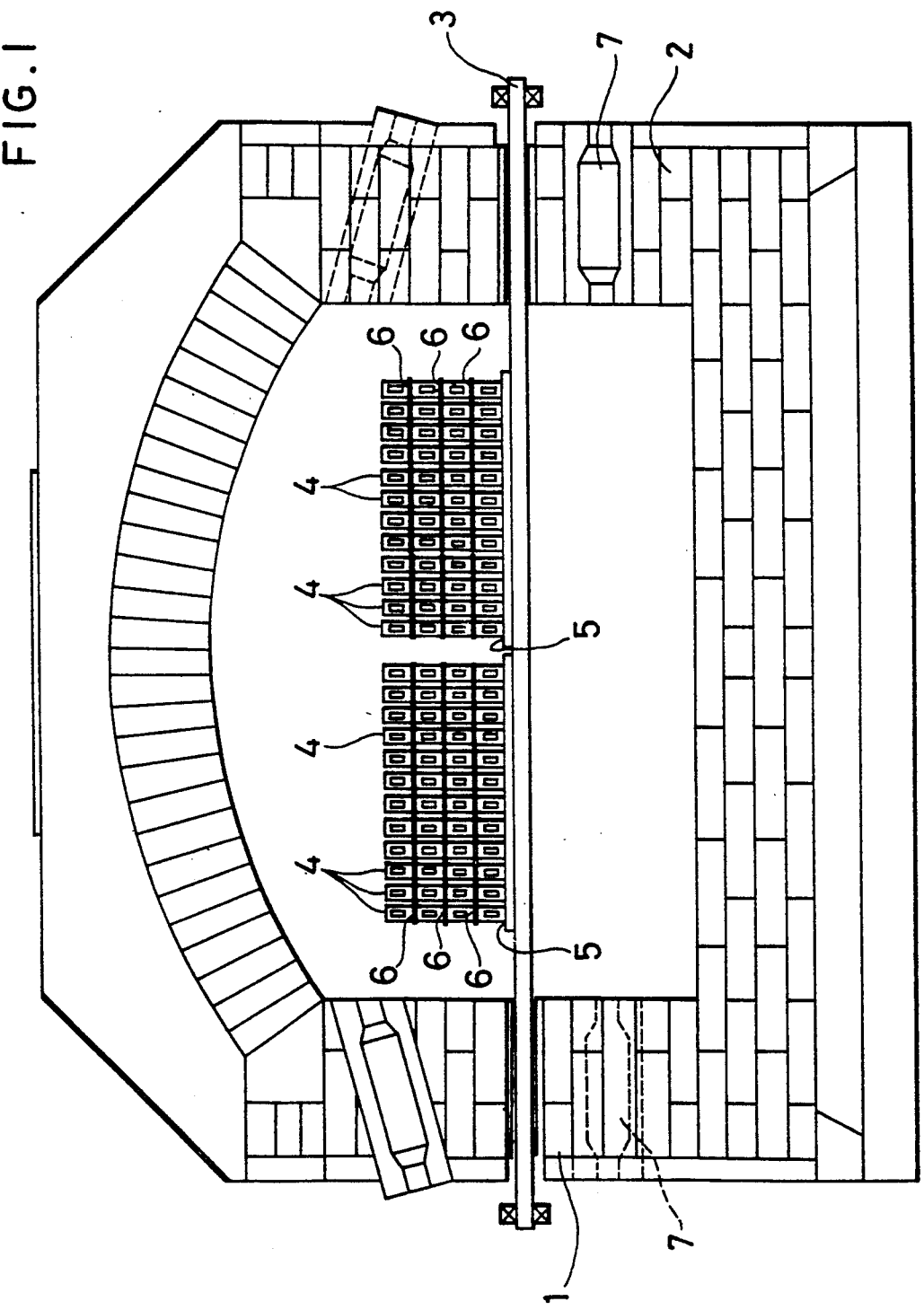
FIG. 1 is a transverse sectional view of a roller hearth kiln which is employed for carrying out the method of this invention.

FIG. 1 is a transverse vertical sectional view of a roller hearth kiln as employed for illustrating a method embodying this invention. The roller hearth kiln has a tunnel-shaped body made of refractories, and is equipped with rollers 3 extending through the opposite sidewalls 1 and 2 thereof. The rollers 3 are employed in a large number and lie horizontally and in parallel to one another. The rollers 3 are driven for rotation by a driving device.

Ceramic building materials 4 are stacked to form a plurality of layers on the rollers 3, and are thereby conveyed. Although the materials 4 are shown as forming a stack of four layers, it is needless to say that they can alternatively be stacked in another number of layers.

Figure 2:
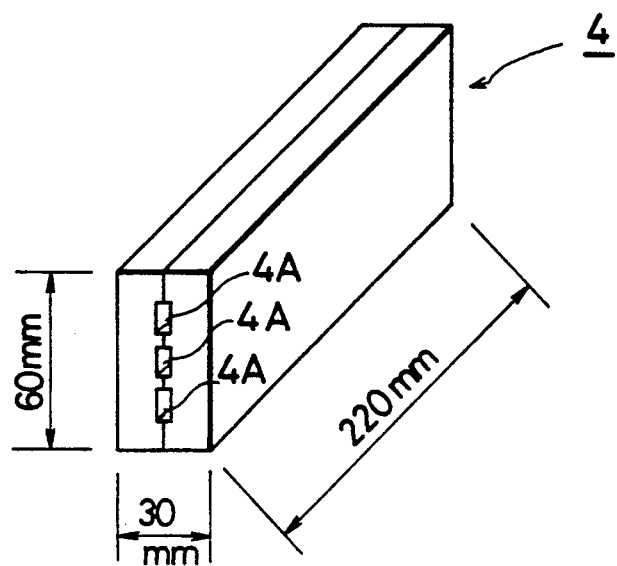
FIG. 2 is a perspective view of a split tile taken as one example of ceramic building material, and comprising two halves which can be separated from each other.
Figure 3:
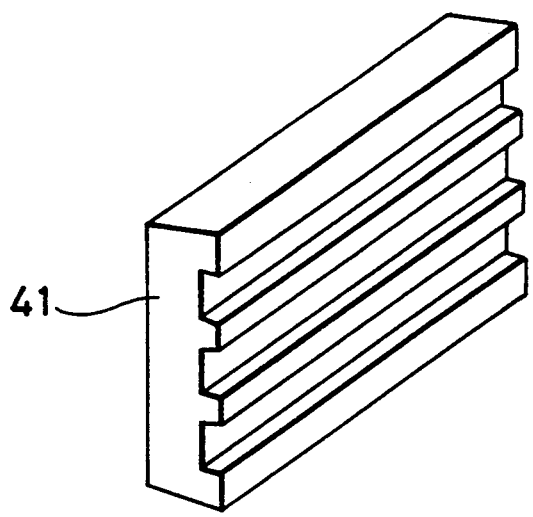
FIG. 3 is a perspective view of one half of the split tile shown in FIG. 2.

Each material 4 is a rectangular split tile having longitudinally extending cavities 4A, as shown in FIG. 2. After it has been fired, the material 4 is split along the cavities 4A into two halves each forming a tile 41, as shown in FIG. 3.

The ceramic building materials 4 are placed on setters 5 (plates of a refractory material on which the materials to be fired are mounted), which are made of silicon carbide or mullite, and a spacer 6 made of silicon carbide or mullite is interposed between every adjoining two of the four layers of materials 4 mounted on each setter 5.

The materials 4 as stacked in layers are conveyed on the rollers 3, and fired by burners 7. The roller hearth kiln has a preheating zone near its inlet, a firing zone in its mid-portion, and a cooling zone near its outlet, though its longitudinal construction is not shown in the drawings. The burners 7 are installed in the firing zone.

The materials 4 stacked in layers impose a heavy load on the rollers 3. Therefore, the rollers 3 are made of reaction sintered silicon carbide having a high mechanical strength.

The stacking of the materials 4 enables them to reside in the kiln for a prolonged period of time. The use of a residence time of at least three hours, as well as of a carefully controlled atmosphere, makes it possible to obtain, for example, fired products having a deep color developed by reduction or oxidation. The method is applicable not only to any material comprising a body and glaze which can be rapidly fired, but also to a wider range of other materials.

Experimental Example 1

Figure 4:
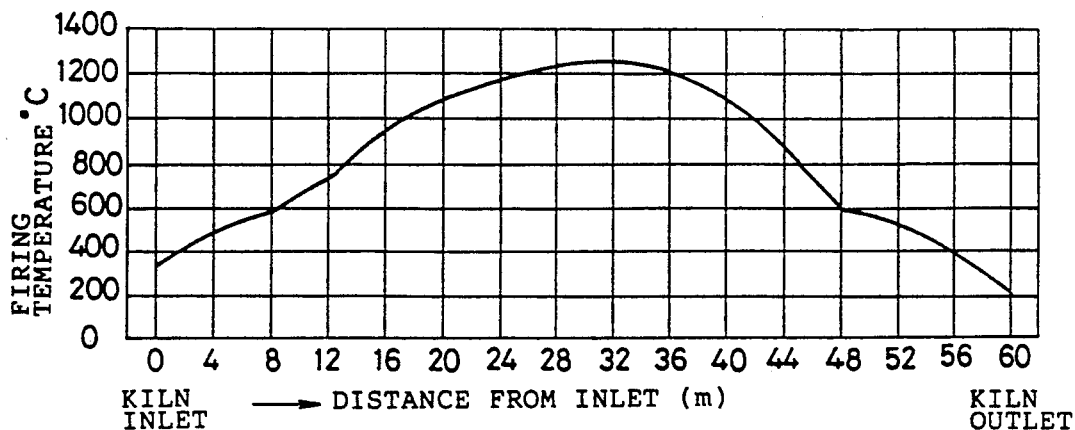
FIGS. 4 to 6 are each a graph showing a different heat curve employed in the roller hearth kiln.

Ceramic building materials 4 were stacked in four layers, as shown in FIG. 1, in a roller hearth kiln having a length of 60 m from its inlet to its outlet, and were fired by employing a residence time of six hours and the heat curve (kiln temperature distribution) as shown in FIG. 4. The materials 4 were of the chemical composition shown below:

| | |
|---|---|
| $SiO_2$ | 75% (by weight) |
| $Al_2O_3$ | 12% |
| $Fe_2O_3$ | 5% |
| Alkali metal oxide | 3% |
| Ignition loss | 5% |

The materials 4 could be fired uniformly from their surfaces to their cores. Each fired product had a satisfactorily colored surface owing to its iron component. The dimensions of each material 4 as fired were as shown in FIG. 2. Each material 4 had a weight of 700 g prior to splitting.

EXPERIMENTAL EXAMPLE 2

Figure 5:
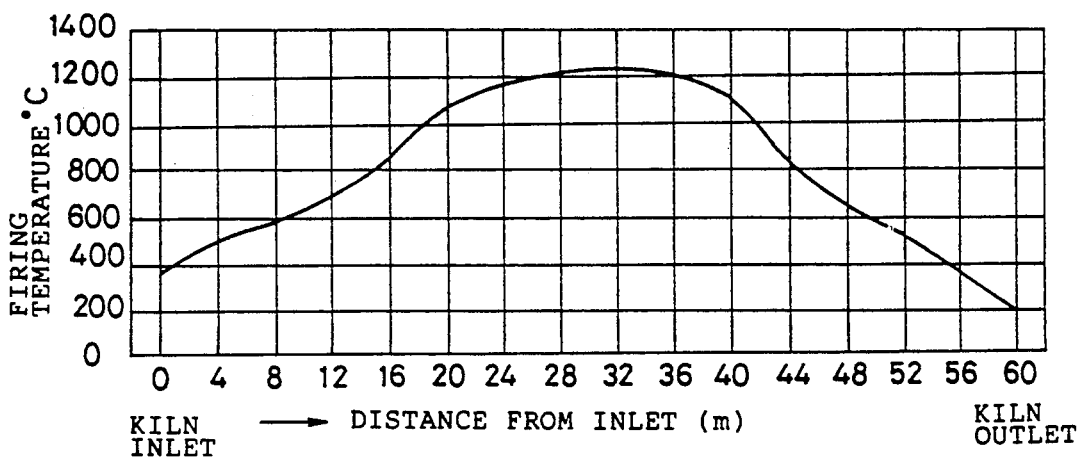

Ceramic building materials 4 were fired by repeating Experimental Example 1, except that the heat curve shown in FIG. 5 and a residence time of four hours were now employed. The materials could be fired uniformly from their surfaces to their cores, and each product had a satisfactorily colored surface owing to its iron component, as had been the case with Experimental Example 1.

EXPERIMENTAL EXAMPLE 3 (Comparative)

Figure 6:
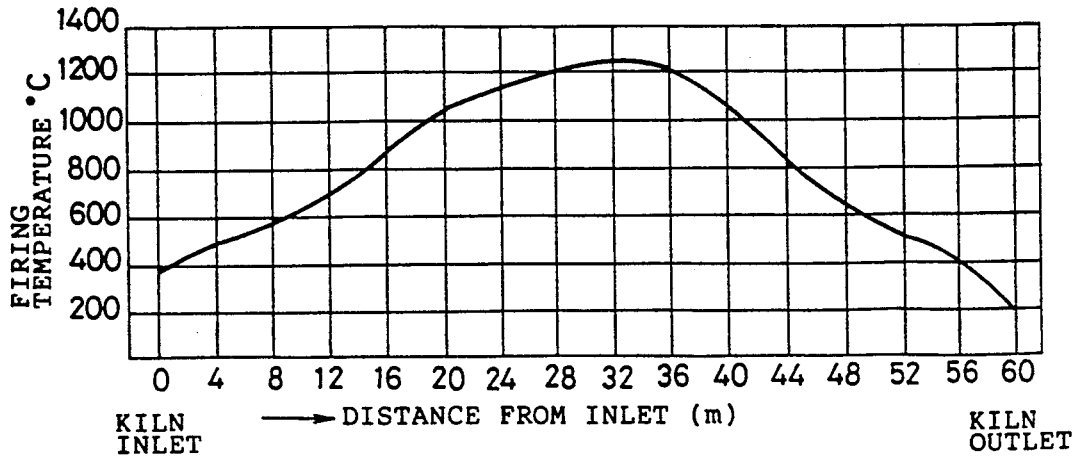
Figure 7:
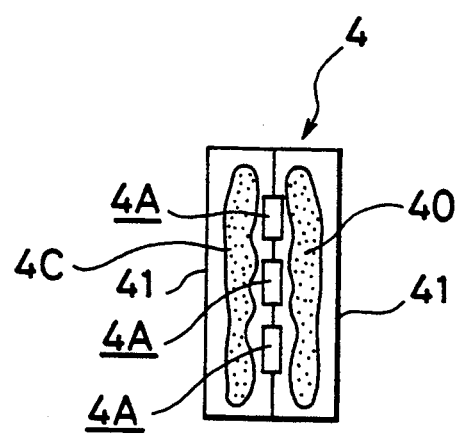
FIG. 7 is a side elevational view of the material as fired.

Ceramic building materials 4 were fired by repeating Experimental Example 1, except that the heat curve shown in FIG. 6 and a residence time of 2.5 hours were now employed. Every product had an unsatisfactorily fired core 40, as shown in FIG. 7. No satisfactory development of color by iron could be achieved on the surface 41 of any product. Some materials 4 even broke during their firing because of the too high heating rate which had been employed.

As is obvious from the Experimental Examples, the fired products of outstanding quality could be obtained when the materials stacked in layers had been allowed to reside in the kiln for a period of time longer than three, or even four, hours. This invention made it possible to attain a high yield of fired products, too.

INDUSTRIAL UTILITY

As is obvious from the foregoing, the method of this invention enables the firing of ceramic building materials in a roller hearth kiln to make fired products having a deep color developed by oxidation or reduction. The stacking of the materials to be fired makes it possible to achieve an increase in production per unit time. Moreover, the method is applicable not only to any material comprising a body and glaze which can be rapidly fired, but also to a wider range of other materials.

We claim:

1. A method of firing ceramic building materials, comprising:
   providing roller hearth kiln including a tunnel-shaped body, a plurality of rollers made of reaction sintered silicon carbide having a high mechanical strength, said rollers being arranged horizontally and parallel to one another to move along the body, and burners for heating interior of the body, said body having an inlet, an outlet, a preheating zone near the inlet, a firing zone in a middle of the body and a cooling zone near the outlet,
   placing setters on the rollers to be carried by the rollers, said setters being made of a material selected from the group consisting of silicon carbide and mullite,
   stacking tiles for ceramic building materials on the setters to form a plurality of layers of the tiles so that a spacer is interposed between adjoining layers of the tiles to separate the layers, said spacer being made of a material selected from the group consisting of silicon carbide and mullite, and
   moving the rollers with the tiles thereon through the kiln at a constant speed to allow the tiles to stay in the kiln for at least three hours so that the tiles are processed at the preheating zone, the firing zone and cooling zone.

2. A method as set forth in claim 1, wherein said building materials are split tiles.

3. A method as set forth in claim 2, wherein each of said split tiles has a thickness of at least 10 mm prior to splitting.

4. A method as set forth in claim 1, wherein each of said building materials has a thickness of at least 10 mm.

* * * * *